UNITED STATES PATENT OFFICE.

JOHN BRISACHER, OF TORONTO, ONTARIO, CANADA.

EYEGLASS-MOUNTING.

1,370,626.  Specification of Letters Patent.  Patented Mar. 8, 1921.

Application filed October 8, 1919. Serial No. 329,253.

*To all whom it may concern:*

Be it known that I, JOHN BRISACHER, a citizen of the Swiss Republic, and resident of the city of Toronto, county of York, Province of Ontario, in the Dominion of Canada, have invented certain new and useful Improvements in Eyeglass-Mountings, described in the following specification and illustrated in the accompanying drawings, that form part of the same.

The principal objects of the invention are, to improve the construction of the nose grip levers and the means for securing same to the bridge piece so as to obviate the loosening of the levers through wear at the pivot and to avoid the necessity of sharp bends in the bridge piece where narrow pupillary distance of lenses is required, thus obviating a constant source of breakage.

The principal feature of the invention consists in the provision of a rounded bearing surface on the nose grip levers and a long rigid journal for the lever pivots.

In the drawings, Figure 1 is a front elevational view of my improved mount.

It is well known to those skilled in the manufacture and adjusting of eye glasses that the nose piece levers, which are formed of soft metal, wear very quickly at the pivot and further, that in order to adjust for narrow pupillary distance it is necessary with most forms of mounts to bend the bridge sharply adjacent to the nose grip levers. This frequently results in fractures which of course destroys the mount.

I have devised a way to overcome these difficulties by raising the levers from the bridge, supporting them upon rounded bearings which may be the minimum diameter and thus allow round bends being made in the bridge.

Figure 1:
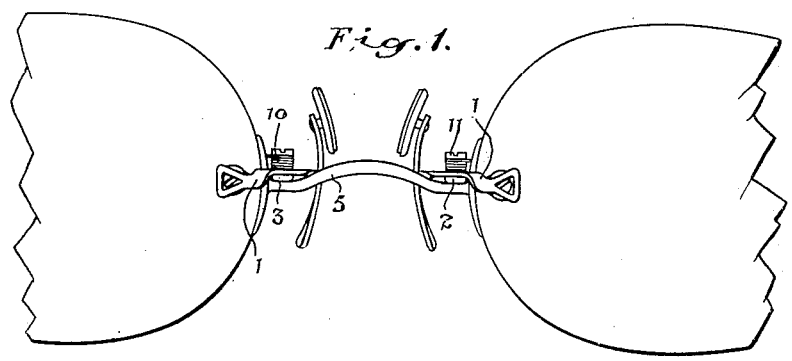
Figure 2:
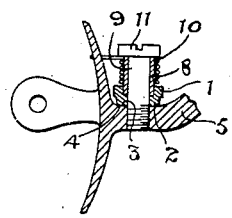
Fig. 2 is an enlarged sectional view of one end of the bridge piece and the lever pivot structure.
Figure 3:
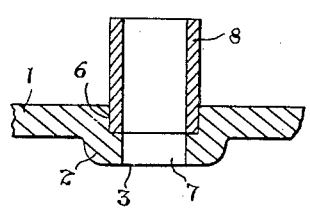
Fig. 3 is an extremely enlarged sectional detail showing the manner of forming the pivot bearing.

In the form of the device illustrated in Figs. 1, 2 and 3, the metal of the levers 1 is formed with a circular depression 2 which forms the base of the bearing and the bottom 3 thereof rests upon the surface 4 of the bridge 5. The depression is made in a die, the metal being forced downwardly by a suitable punch which forms a circular recess 6 surrounding the hole 7.

A tube 8 is inserted into the recess 6 fitting tightly therein and it is preferably soldered securely. The tube 8 forms a long pivot bearing surface upon the pin 9 which is fastened into the bridge 5.

The coil spring 10 for holding the nose grip levers encircles the tube 8 and is held in place between the lever and the head 11 of the pin.

This structure is very simple and effective in presenting a small end bearing surface for the levers and also elevates the levers from the bridge piece to give more freedom of movement in their swinging operation.

Figure 4:
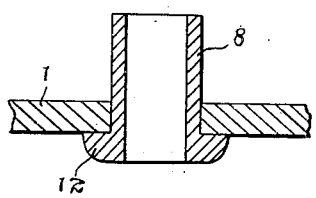
Fig. 4 is an enlarged sectional detail view of a modification of form of pivot bearing.

In Fig. 4 I show a slight modification wherein the tube 8 is formed with a flanged end 12 which forms the rounded bearing similar to that previously described and it will be equally effective.

The securely fastened tube members 8 provide a long and rigid bearing support for the levers consequently they will not wear readily and the mount retains its adjustment for a long period.

What I claim as my invention is:—

1. In an eye glass mounting, the combination with a bridge piece and rigid pivot pins secured therein, of nose grip levers having circular bearings projecting below the under side to bear upon the bridge, and tubular members rigid with said levers and extending upwardly therefrom and encircling said pivot pins.

2. In an eye glass mounting, the combination with the bridge piece and rigid pivot pins secured therein, of nose grip levers pivoted on said pins having a circular depression in the upper surface and a circular projection from the under surface adapted to bear upon the bridge piece, tubular members secured in the depressions in said levers and encircling said pins, and springs encircling said tubular members.

JOHN BRISACHER.